United States Patent [19]

Weber

[11] Patent Number: 4,668,303
[45] Date of Patent: May 26, 1987

[54] METHOD OF PREVENTING STRESS CORROSION IN A BELLOWS EXPANSION JOINT

[75] Inventor: Paul S. Weber, Baytown, Tex.

[73] Assignee: Exxon Research and Engineering Company, Florham Park, N.J.

[21] Appl. No.: 801,333

[22] Filed: Nov. 25, 1985

Related U.S. Application Data

[62] Division of Ser. No. 520,433, Aug. 4, 1983, Pat. No. 4,576,404.

[51] Int. Cl.$^4$ .................. B08B 9/00; B08B 30/00; F16L 53/00; F16L 11/12
[52] U.S. Cl. .................. 134/22.13; 134/27; 285/41; 285/47; 285/48; 285/50; 285/55; 285/226; 285/227; 252/387; 252/390
[58] Field of Search .................. 134/22.13, 27; 285/41, 285/47, 48, 50, 55, 226, 227; 585/950; 252/387, 390

[56] References Cited

U.S. PATENT DOCUMENTS

| | | | |
|---|---|---|---|
| 2,291,085 | 7/1942 | Lehmfouhl et al. | 134/27 |
| 2,520,751 | 8/1950 | Zucrow | 285/226 X |
| 2,536,793 | 1/1951 | Andersson et al. | 285/41 X |
| 2,651,104 | 9/1953 | Ginos | 134/27 X |
| 2,823,150 | 2/1958 | Henricks | 134/27 X |
| 3,067,070 | 12/1962 | Loucks | 134/27 |
| 3,127,200 | 3/1964 | Loyog | 285/226 |
| 3,186,721 | 6/1965 | Petri | 285/41 X |
| 3,232,640 | 2/1966 | Donkle, Jr. | 285/222 X |
| 3,488,067 | 1/1970 | Sommer | 285/41 |
| 3,496,017 | 2/1970 | Weed | 134/27 X |
| 3,517,949 | 6/1970 | Hirai et al. | 285/47 X |
| 3,522,093 | 7/1970 | Woolman | 134/22.13 |
| 3,536,081 | 10/1970 | Riess | 134/22.13 |
| 3,811,713 | 5/1974 | Barrett et al. | 285/226 |
| 3,874,708 | 4/1975 | Gresenr | 285/226 X |
| 3,901,839 | 8/1975 | Jjerman | 285/41 |
| 4,045,056 | 8/1977 | Kandokov et al. | 285/41 |
| 4,165,107 | 8/1979 | Offo et al. | 285/41 |
| 4,308,076 | 12/1981 | Knowlton | 134/22.13 X |
| 4,317,685 | 3/1982 | Ahuja et al. | 134/27 X |

FOREIGN PATENT DOCUMENTS

0137893 7/1978 German Democratic Rep. ............ 134/22.13

Primary Examiner—Andrew H. Metz
Assistant Examiner—William G. Wright
Attorney, Agent, or Firm—Joseph J. Dvorak

[57] ABSTRACT

A novel bellows expansion joint design and method of preventing stress corrosion cracking incorporates an internal cylindrical weir or sleeve which defines an inner flushing chamber adjacent the expansion bellows wherein connections are provided on the exterior wall of the expansion joint body to allow the admission of a chemical solution or treating fluid directly onto the inside surface of the bellows from an external connection to the expansion joint. In addition, a further connection is provided to a second flushing chamber surrounding the exterior of the bellows so that a similar solution may be admitted and allowed to overflow from an upper portion of the chamber.

7 Claims, 2 Drawing Figures

METHOD OF PREVENTING STRESS CORROSION IN A BELLOWS EXPANSION JOINT

This is a division of application Ser. No. 520,433, filed Aug. 4, 1983 now U.S. Pat. No. 4,576,404.

BACKGROUND OF THE INVENTION

In various processes, including petroleum and petrochemical processing, metallic bellows expansion joints are utilized to absorb relative movement in piping and conduit systems. The specific alloy utilized for the bellows depends on the service environment encountered in the particular process unit. In many cases, austenitic type steels and stainless steels are required due to the combination of elevated temperatures and corrosive elements in the process fluid. These austenitic steels and stainless steels are subject to metallurigal attack known as stress corrosion cracking under certain conditions. In some cases, such stress corrosion cracking is caused by the presence of certain types of acid-forming compounds such as hydrogen sulfide being present in the process stream and therefore on the bellows steel. For expansion joints operating at high temperatures, conditions conducive for the initiation of stress corrosion cracking often exist only during a shut-down of the process unit when the expansion bellows cool from their high operating temperature down to ambient temperature. Expansion joint bellows are particularly vulnerable to this type of failure due to the extremely high stress levels present in the bellows during such down time and the relatively thin material employed in bellows fabrication.

In practice, it has been found that the actual attack and initial cracking of a stainless steel metal bellows occurs only after the stainless steel has been sensitized, so to speak, by having been heated to a high elevated temperature and then cooled, and is then attacked by some kind of acid. A family of weak acids is formed on the stainless steel by combination of water and oxygen from the air and almost any sulfur compound, or product of sulfur corrosion, from the chemical process, when the metal bellows are cooled. When the acid forms on the sensitized metal, cracks will occur in the metal.

One way of combatting this phenomenon in the past upon unit shut-down has been to spray, or attempt to spray, a chemical solution through the expansion joint external shroud seal openings in order to try to flush the outside of the expansion bellows to neutralize any acid that may form on the exterior surface of said bellows. Attempts have also been made to spray a neutralizing solution on the interior surface of the conduit in an attempt also to flush the inner walls of the bellows. These attempts have proved difficult in application, or impossible, due to the configuration of the surrounding parts in the conduit to protect the bellows from direct exposure to the elevated temperatures of the process fluid. In addition, access to the internal surface of the bellows must be obtained from inside the expansion joint, and the time delay in gaining this access can be sufficiently long so as to permit cracking before such access is obtained. After exposure to the heated process conditions, this stress corrosion cracking can occur in a very short period of time after shut-down of the unit, and experience has shown that expansion joint failures will occur when proper treatment is not provided within hours of unit shut-down.

It has also been found that if such precautions are not taken for the prompt protection and flushing of an expansion bellows immediately after unit shut-down, the likelihood of stress corrosion cracks appearing is greatly increased but they will often be found only upon restart of the unit, at which time, when the failure is found, the unit must be again withdrawn from service at great cost and expense merely to replace the failed expansion joint.

SUMMARY OF THE INVENTION

Accordingly, the novel and new bellows expansion joint design of this invention and method of preventing stress corrosion cracking therein provides a solution to the foregoing problem and incorporates an internal cylindrical weir or sleeve which defines an inner flushing chamber adjacent the expansion bellows wherein connections are provided on the exterior wall of the expansion joint body to allow the admission of a chemical solution or treating fluid directly onto the inside surface of the bellows from an external connection to the expansion joint. In addition, a further connection is provided to a second flushing chamber surrounding the exterior of the bellows so that a similar solution may be admitted and allowed to overflow from an upper portion of the chamber.

The novel structure of the invention permits a novel method to be practiced for preventing stress corrosion cracking of the expansion bellows in conduits which have been exposed to elevated temperatures and have hydrogen sulfide or other acid-forming compounds present upon cooldown of the bellows. This method includes the steps of introducing a neutralizing solution into a first chamber interior of the bellows and simultaneously introducing a similar solution into a second chamber exterior of the bellows, all from the outside of the conduit member. The novel method permitted by the structure of the invention allows the introduction of the necessary neutralizing solutions promptly, either during cooldown of the conduit or immediately afterward, thereby eliminating any long time delays previously experienced in attempting to introduce the same types of neutralizing solutions to the interior and exterior surfaces of conventional expansion bellows employed in similar operating environments. Ordinarily, solution introduction will preferably be started as soon as possible after the bellows and surrounding conduit structure have cooled below 212° F.

Similarly, the invention contemplates an improved expansion joint configuration for use in a high temperature gas conduit wherein an inner cylindrical sleeve is provided adjacent the inner surface of the bellows to form a chamber contiguous therewith so that a neutralizing solution may be introduced from a connection means on the exterior surface of the expansion joint so that said solution may be readily introduced into the interior surface of the bellows upon cooldown thereof from the elevated operating temperature of the expansion joint. The novel structural arrangement also contemplates a similar solution-containing chamber exterior of the bellows so that concurrently with the introduction of solution to the interior of the bellows a similar solution may be introduced to completely wash the bellows' exterior surface.

Accordingly, it is an object of the present invention to provide a new and novel method for protecting bellows expansion joints from stress corrosion cracking upon cooldown from elevated surface temperature to ambient temperature when said bellows have been operated in a high temperature environment in the presence of acid-forming compounds such as hydrogen sulfide.

A further object of the invention is to provide a new and novel bellows expansion joint design wherein fluid treating chambers accessible from an exterior surface of the expansion joint are provided on both the inside wall of the bellows as well as on the outside wall of the bellows.

A still further object of the invention is to provide an improved bellows expansion joint design which is simple and rugged in construction, economical to manufacture, and reliable in service.

BRIEF DESCRIPTION OF THE DRAWINGS

For a better understanding of the nature of the invention, reference should be made to the accompanying drawings in which.

It will be understood that the drawings illustrate merely two preferred embodiments of the invention and that other embodiments are contemplated within the scope of the claims hereinafter set forth.

DETAILED DESCRIPTION OF THE INVENTION

Figure 1:
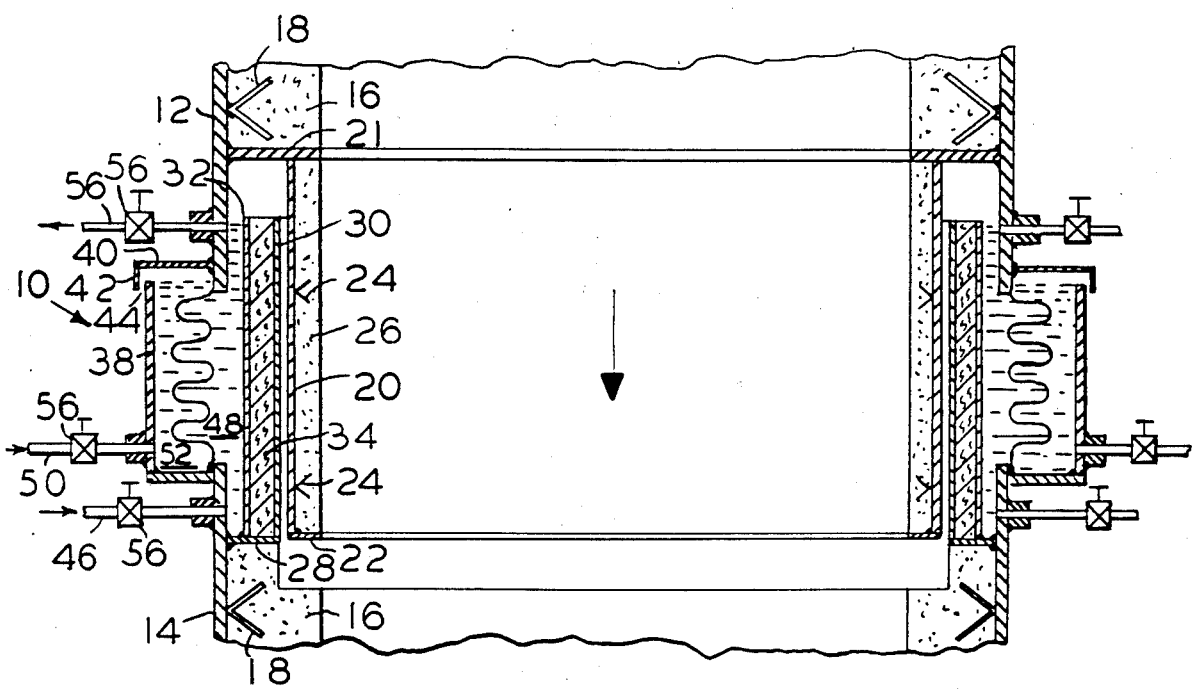
FIG. 1 is a vertical cross-section of a bellows expansion joint in accordance with one form of the invention.

Referring to FIG. 1, an expansion joint 10 in accordance with the invention is installed in a vertical and downward flowing gas conduit. The expansion joint 10 includes an upper conduit wall section 12 and a lower conduit wall section 14. Both of these conduit wall sections 12 and 14 are provided with a suitable refractory insulation lining 16 secured thereto by a plurality of conventional anchor members 18. Although not specifically illustrated, it will be understood that the refractory insulation 16 will generally be of a dual layer type wherein the innermost surface is a hard refractory wear layer and the outer portion thereof, closest to the conduit wall, will be a less dense higher insulating capacity material. The upper conduit wall section 12 includes an annular flange member 21 to which is welded a depending cylindrical skirt 20. Skirt 20 includes a lower annular flange member 22 and also includes insulation anchor members 24 and a layer of internal insulation lining 26.

The lower conduit wall section 14 includes an annular flange 28 which supports an inner cylindrical sleeve member 30. The flange 28 also includes an outer cylindrical sleeve member 32 which, in cooperation with the sleeve 30, defines an annular cylindrical cavity therebetween for containing a ceramic fiber insulation blanket, such as Kaowool, designated 34.

The expansion joint in accordance with the invention includes a flexible cylindrical bellows 36 secured at its upper and lower ends, respectively, to the upper conduit wall portion 12 and the lower conduit 14. While applicant in describing his expansion joint assembly has referred to adjacent conduit walls 12 and 14, it will be understood that the expansion joint assembly is normally provided with short sections of conduit wall integral therewith with suitable flanges or end connections (not shown) for weldable connection directly to the main conduit of the process unit in which the expansion joint is to be used. In practice, the expansion joint will be provided by a vendor as an assembly with the appropriate operating diameter for subsequent integral installation into the associated process piping.

Also secured to the lower conduit wall section 14 is an external jacket "L" shaped member or shroud 38 which extends upwardly to a rim portion level with or slightly above the upper end of the bellows 36 and its attachment point to the conduit 12. The arrangement of the shroud 38 defines an outer chamber 52 for containing a solution in contact with the exterior of the bellows 36. The upper portion of this chamber 52 is enclosed by a cover or shield 40 weldably attached to the conduit 12 which cover or shield 40 also includes a downwardly depending lip whose edge overlaps the upper edge of the shroud 38 to define a solution overflow opening 44. Also provided in the lower half of the expansion joint assembly are two solution inlet conduits 46 and 50 communicating respectively with the lower portions of the outer solution chamber 52 and the inner solution chamber 48. As can be seen from the drawing, the upper edge of the cylindrical sleeve 32 is disposed slightly above the outlet opening of the overflow conduit 54 so that solution entering the chamber 48 through conduit 46 will overflow through conduit 54 rather than rise above the rim of the jacket 32 and damage the ceramic fiber insulation 34. Each of the inlet conduits 46 and 50 and outlet conduit 54 is provided with a suitable shut-off or drain valve 56.

In operation, the bellows expansion joint of the present invention would normally be free of any liquid in the inner and outer chambers 48 and 52 during the high temperature operating mode of the associated process unit. As shown, the hot gas flow would be in a downward direction through the conduit, and the conduit would be arranged in a vertical orientation. Upon shutdown of the associated process unit for whatever reason, either a planned shut-down or an emergency shut-down due to some unforeseen process discontinuance, a gradual cooling of all of the components of the conduit and process unit and associated expansion bellows will occur. While ordinarily, without the expansion joint in accordance with the invention, a considerable time delay would be associated with any attempt to enter into the interior of the conduit in order to solution wash the inside surface of the bellows 36, the arrangement of the invention is such that solution such as a mildly caustic soda ash solution or any other basic neutralizing solution may be introduced at any desired time after unit shut-down through the conduits 50 and 46 to flood the chambers 48 and 52. While this would not ordinarily be done when the metallic parts are still at their high elevated temperatures which might be sufficient to subject these metallic parts to thermal shock, the solution may be introduced as soon as the temperature drop is sufficient to allow the safe introduction of the neutralizing solutions. This would normally be as soon as the surrounding parts have cooled below 212° F. As these chambers are flooded by the rise of their respective liquid levels, the overflow solution will exit through the conduit 54 from the inner chamber 48 and through the overflow weir opening 44 from the exterior chamber 52. While it is contemplated that optimized stress corrosion cracking preventions and purging of the acidic compounds adjacent and on the surface of the bellows may be obtained by circulating a basic or caustic solution, it is also contemplated that a sufficient flow of neutral pH 7 water would be adequate to also accomplish the same desired protection in preventing stress corrosion cracking in the bellows 36. Prior to return of the unit to service, the solutions in the chambers 48 and 52 will be drained therefrom through their respective conduits 46 and 50 so that no risk of vaporizing of these fluids will occur at the elevated operating temperature of the unit gases flowing in the main conduit.

Figure 2:
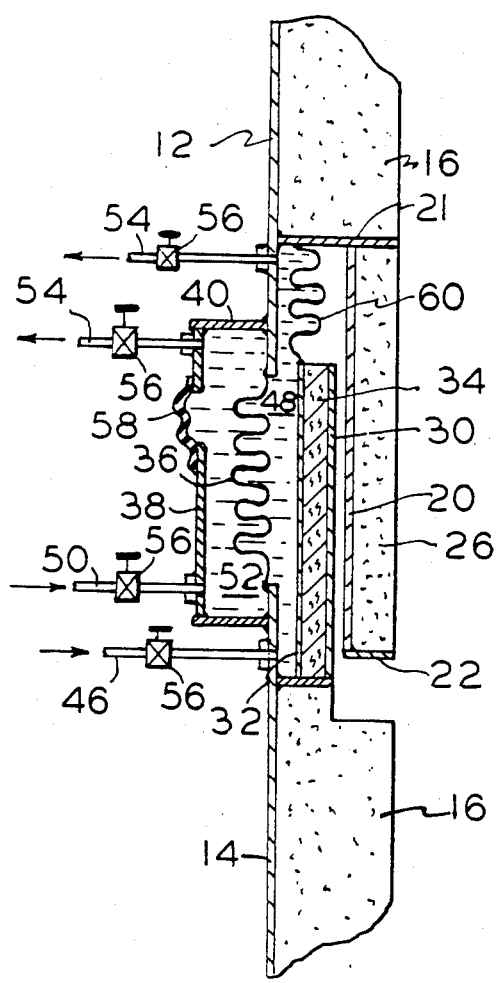
FIG. 2 is a partial vertical cross-section of an alternate embodiment of the invention.

Referring to FIG. 2, wherein like elements with similar function to FIG. 1 have been designated with like reference numbers, an alternate embodiment of the invention is shown. In this embodiment, unlike the FIG. 1 embodiment, the expansion bellows may be oriented in non-vertical conduit sections and may be successfully flushed without loss of solution into the conduit interior.

Specifically, in FIG. 2, an inner seal 60, such as the bellows shown, extends between the upper edge of sleeve 32 and the annular flange 21 to prevent leakage of flushing solution into the conduit interior. Additionally, an outer seal 58, which may be a rubber membrane as shown or of other alternate material, seals the chamber 52 so that discharge of fluid therefrom may occur through the added conduit 54 and valve 56. In this fashion the FIG. 2 embodiment expansion joint may readily be located in horizontal or inclined conduits to provide quick and positive purging and neutralizing of any acids that may form on the interior or exterior surfaces of the bellows membrane structure.

While two specific embodiments of the invention have been shown and described in detail to illustrate the application of the inventive principle and method of the invention, it will be understood that the invention may be embodied otherwise without departing from such principles. For instance, while seal 60 in FIG. 2 has been shown as a bellows, those skilled in the art will realize that a packing type seal or a labyrinth seal could be substituted therefor as determined by joint design movement and temperatures.

What is claimed is:

1. The method of preventing stress corrosion cracking upon cooldown of metallic expansion bellows in a conduit which has been exposed to elevated temperatures in the presence of sulfur compounds comprising the steps of:
   introducing an acid neutralizing basic solution into a first chamber to contact and wet the inner surface of said bellows;
   introducing an acid neutralizing solution into a second chamber to contact and wet the outer surface of said bellows; and
   maintaining said solution in said first and second chambers during cooldown of said bellows and conduit from said elevated temperature.

2. The method of claim 1 including the step of continuously flowing the acid neutralizing solution through said first and second chambers during cooldown.

3. The method of claim 2 including the step of draining the acid neutralizing solution from said first and second chambers prior to return of said bellows and conduit to elevated temperature service.

4. The method of preventing stress corrosion cracking upon cooldown of stainless steel expansion bellows in a gas carrying conduit which has been exposed to elevated temperatures in the presence of an acid forming compounds in said conduit comprising the steps of:
   introducing a wash solution selected from the group consisting of water and alkaline solutions into a first chamber to contact and wet the inner surface of said bellows;
   introducing a wash solution into a second chamber to contact and wet the outer surface of said bellows; and
   maintaining said solution in said first and second chambers during cooldown of said bellows and conduit from said elevated temperature.

5. The method of claim 4 including the step of continuously flowing the wash solution through said first and second chambers during cooldown.

6. The method of claim 5 including the step of draining the wash solution from said first and second chambers prior to return of said bellows and conduit to elevated temperature service.

7. The method of claim 6 wherein said wash solution is an alkaline solution of soda ash.

* * * * *